US012619422B1

(12) United States Patent
Long et al.

(10) Patent No.: US 12,619,422 B1
(45) Date of Patent: May 5, 2026

(54) FIRMWARE UPGRADE OF COMPUTING DEVICE FLEETS

(71) Applicant: Auradine, Inc., Santa Clara, CA (US)

(72) Inventors: Marshall Long, Sugarland, TX (US);
Sridhar Chirravuri, Sunnyvale, CA
(US); Diana Pham, Santa Clara, CA
(US); Matangi Vaidyanathan, Santa
Clara, CA (US); **Sairam Jalakam
Devarajulu**, Santa Clara, CA (US)

(73) Assignee: Auradine, Inc., Santa Clara, CA (US)

( * ) Notice: Subject to any disclaimer, the term of this
patent is extended or adjusted under 35
U.S.C. 154(b) by 0 days.

(21) Appl. No.: 19/212,091

(22) Filed: May 19, 2025

(51) Int. Cl.
*G06F 9/445* (2018.01)
*G06F 8/65* (2018.01)
*G06F 21/51* (2013.01)

(52) U.S. Cl.
CPC ................ *G06F 8/65* (2013.01); *G06F 21/51*
(2013.01)

(58) Field of Classification Search
CPC ... G06F 8/65; G06F 21/51; G06F 8/71; G06F
8/61; G06F 8/60; G06F 16/2379; G06F
16/23; G06F 8/77
See application file for complete search history.

(56) References Cited

U.S. PATENT DOCUMENTS

| | | | | |
|---|---|---|---|---|
| 8,893,114 B1* | 11/2014 | Cooley | ..................... | G06F 8/66 |
| | | | | 717/169 |
| 2016/0124740 A1* | 5/2016 | Choi | ........................ | G06F 8/654 |
| | | | | 717/168 |
| 2023/0005305 A1* | 1/2023 | Sakurai | ................... | G06F 13/00 |
| 2024/0311133 A1* | 9/2024 | Koujiro | ................. | G06F 3/1285 |

* cited by examiner

*Primary Examiner* — Chuck O Kendall
(74) *Attorney, Agent, or Firm* — Fish & Richardson P.C.

(57) ABSTRACT

Some aspects of the present disclosure involve a method
including: receiving instructions specifying a particular site
from among a plurality of sites, wherein each of the plurality
of sites comprises one or more computing devices, each of
the one or more computing devices comprising a plurality of
integrated circuit (IC) chips that are configured to perform
similar computations in parallel; and in response to receiv-
ing the instructions, performing a firmware upgrade for each
of the one or more computing devices at the particular site.

20 Claims, 8 Drawing Sheets

700

702

Receive instructions from an operator specifying a particular site from among a plurality of sites

704

In response to receiving the instructions, perform a firmware upgrade for each of the one or more computing devices at the particular site

FIRMWARE UPGRADE OF COMPUTING DEVICE FLEETS

TECHNICAL FIELD

The present disclosure generally relates to devices, systems, and methods to upgrade the firmware of one or more fleets of computing devices.

BACKGROUND

Managing firmware upgrades across computing operations distributed across a large number of computing devices is complex, time-consuming, and prone to failures that can disrupt computing efficiency. Traditional upgrade processes can require manual intervention, lack failure recovery mechanisms, and do not provide a structured approach to deploying updates at scale. This can result in inconsistent firmware versions across computing devices, increased downtime, and operational inefficiencies, particularly when managing computing devices across multiple sites or groups.

SUMMARY

One aspect of the present disclosure relates to a method including: receiving instructions specifying a particular site from among a plurality of sites, wherein each of the plurality of sites includes one or more computing devices, each of the one or more computing devices including a plurality of integrated circuit (IC) chips that are configured to perform similar computations in parallel; and in response to receiving the instructions, performing a firmware upgrade for each of the one or more computing devices at the particular site.

The method can include other optional features. For example, in some implementations, receiving the instructions specifying the particular site includes: receiving, through a user interface of an operator machine, an input selecting the particular site from among the plurality of sites represented on the user interface.

In some implementations, performing the firmware upgrade for each of the one or more computing devices at the particular site includes at least one of: performing a firmware upgrade of a central controller unit included in each of the one or more computing devices at the particular site, or performing a firmware upgrade of an individual controller unit included in each of the plurality of IC chips in each of the one or more computing devices at the particular site.

In some implementations, at least one site of the plurality of sites comprises a plurality of groups, each group of the plurality of groups comprising one or more computing devices, the method further including: receiving second instructions specifying one or more groups of the at least one site; and in response to receiving the second instructions, performing a firmware upgrade for each of the one or more computing devices in each of the one or more specified groups of the at least one site.

In some implementations, receiving the second instructions specifying the one or more groups of the at least one site includes: receiving, through a user interface of an operator machine, an input selecting the one or more groups from among the plurality of groups represented on the user interface.

In some implementations, performing the firmware upgrade for each of the one or more computing devices in each of the one or more specified groups includes at least one of: performing a firmware upgrade of a central controller unit included in each of the one or more computing devices in each of the one or more specified groups, or performing a firmware upgrade of an individual controller unit included in each of the plurality of IC chips in each of the one or more computing devices in each of the one or more specified groups.

In some implementations, performing the firmware upgrade further includes: receiving, through a user interface of an operator machine, an input configuring a start time point of the firmware upgrade; receiving, through the user interface, an input configuring a time window of the firmware upgrade; and performing a staged rollout of the firmware upgrade of the plurality of IC chips at the particular site within the time window from the start time point.

In some implementations, performing the firmware upgrade includes downloading and installing a new firmware image to the central controller unit included in each of the one or more computing devices or the individual controller unit included in each of the plurality of IC chips in each of the one or more computing devices.

In some implementations, performing the firmware upgrade further includes: computing a checksum or cryptographic hash of the new firmware image; comparing the checksum or the cryptographic hash to a predetermined value; and rejecting or accepting the new firmware image based on the comparison result.

In some implementations, performing the firmware upgrade further includes: detecting a failure during downloading or installing of the new firmware image; and reverting each of the plurality of IC chips to a previous firmware image.

In some implementations, performing the firmware upgrade further includes: verifying the new firmware image using a public key, wherein the new firmware image was signed with a private key paired with the public key; and installing the new firmware image in response to the verification being successful.

In some implementations, the method further including: receiving third instructions specifying a particular computing device at the particular site; and in response to receiving the third instructions, performing a firmware upgrade for the particular computing device at the particular site.

In some implementations, receiving the third instructions specifying the particular computing device includes: receiving, through a user interface of an operator machine, an input selecting the particular computing device from among a plurality of computing devices at the particular site represented on the user interface.

In some implementations, performing the firmware upgrade for the particular computing device at the particular site includes at least one of: performing a firmware upgrade of a central controller unit included in the particular computing device, or performing a firmware upgrade of an individual controller unit included in each of a plurality of IC chips in the particular computing device.

In some implementations, the method further including: receiving third instructions specifying a particular computing device in the one or more specified groups of the at least one site; and in response to receiving the third instructions, performing a firmware upgrade for the particular computing device.

In some implementations, receiving the third instructions specifying the particular computing device includes: receiving, through a user interface of an operator machine, an input selecting the particular computing device from among a plurality of computing devices in the one or more specified groups represented on the user interface.

In some implementations, performing the firmware upgrade for the particular computing device includes at least one of: performing a firmware upgrade of a central controller unit included in the particular computing device, or performing a firmware upgrade of an individual controller unit included in each of a plurality of IC chips in the particular computing device.

In some implementations, the plurality of IC chips are configured to perform cryptographic hash computations or process large language model data.

Another aspect of the present disclosure relates to one or more non-transitory computer-readable media storing instructions that, when executed, cause one or more processors to perform any of the foregoing operations.

Another aspect of the present disclosure relates to an apparatus that includes one or more processors and memory storing instructions that, when executed, cause the apparatus to perform any of the foregoing operations.

DETAILED DESCRIPTION

Figure 1:
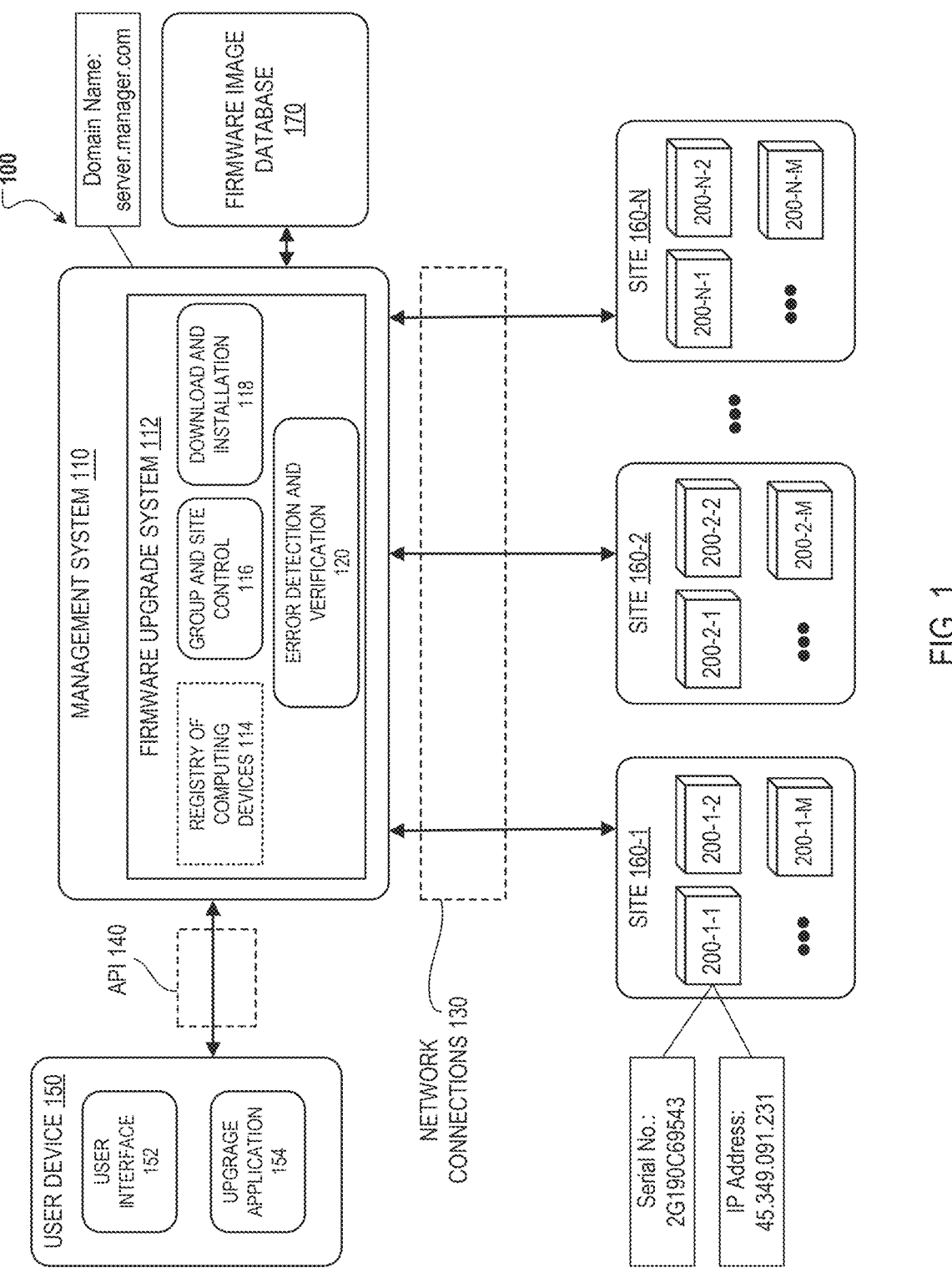
FIG. 1 is a diagram illustrating an example system.

The present disclosure provides methods and systems for upgrading the firmware of computing devices that are distributed across one or more sites or groups. The computing devices are configured to perform similar computational tasks in parallel, e.g., performing cryptographic operations for cryptocurrency mining, or processing data for large language model (LLM) tasks for artificial intelligence (AI) applications. A plurality of the computing devices can be controlled or managed by a common operator, e.g., an enterprise performing cryptocurrency mining or AI application tasks, or a device manufacturer providing maintenance services, among others. These computing devices are collectively referred to as a fleet of computing devices, and such a fleet can include a large number of computing devices, e.g., in the order of hundreds or thousands of devices. The computing devices in a fleet can be distributed across different geographical locations (sites), and/or can be grouped into different groups depending on computational objectives or other parameters. An operator of the fleet can manage the computing devices using a centralized management system, including upgrading the firmware of the computing devices. The operator can, through a user interface of the management application, select a particular site from among a plurality of sites, and control the management system to perform firmware upgrades on the computing devices at the particular site. The operator can control the management system to perform firmware upgrades on all the computing devices at the site. Alternatively, the operator can select one or more particular groups from among a plurality of groups at the particular site, and control the management system to perform a firmware upgrade of all the computing devices in the selected group(s). Additionally or alternatively, the operator can select a particular individual computing device at the site and control the management system to perform a firmware upgrade on the selected computing device.

Each of the computing devices can be configured with a plurality of integrated circuit (IC) chips and a central controller unit, with each IC chip including individual controller units as well. In some implementations, the management system can perform a firmware upgrade of the central controller unit included in each computing device. In some implementations, the management system can perform a firmware upgrade of an individual controller unit included in each IC chip of each computing device. The operator can configure a start time point and a time window for the firmware upgrade, and the management system can perform a staged rollout of the firmware upgrade within the time window from the start time point. The management system can detect an error or a failure during downloading and installing a new firmware image and revert to a previous firmware image.

The disclosed techniques can upgrade a large number of computing devices selected by an operator or a user in parallel. The operator can easily select a large number of computing devices by selecting a site or a group, and all the computing devices in the selected site or selected group can be upgraded in parallel. The operator can control the timing of upgrade. For example, the operator can configure a start time point and a time window for firmware upgrade of all the computing devices in the selected site or selected group.

FIG. 1 is a schematic diagram illustrating an example system (or computer network) 100, including multiple computing devices 200-1-1 through 200-1-M, 200-2-1 through 200-2-M and 200-N-1 through 200-N-M (each of which is referred to generally as computing device 200 in the following sections), respectively distributed across a plurality of sites 160-1, 160-2, . . . , 160-N, and a centralized management system 110.

The management system 110 can be a dedicated hardware device located in a "central" location for centralized control of the computing devices 200. Alternatively, the management system 110 can be a cloud server dispersed across one or more locations.

In the example of FIG. 1, computing devices 200 are grouped into multiple sites 160-1 through 160-N (collectively, sites 160). The sites 160 can correspond to data centers, and the computing devices in a given site can be in a common data center. For example, computing devices 200-1-1 through 200-1-M are grouped into a first site 160-1 (e.g., housed in a first data center), computing devices 200-2-1 through 200-2-M are grouped into a second site 160-2 (e.g., housed in a second data center), and so on. In general, the system 100 can include any number of computing devices 200, e.g., several hundred, one thousand, ten thousand, one hundred thousand, one million, or more computing devices 200, in any number of sites 160, e.g., one, two, five, ten, fifty, one hundred, or more sites 160. Each computing device 200 can include multiple IC chips (e.g., tens, hundreds, or more). The management system 110 is configured to control the firmware upgrade of each computing device 200 in the system 100.

The system 100 can be or include a wide area network (WAN) such that management system 110 has a domain name (e.g., "server.manager.com") and each computing device 200 has a respective unique identifier (UID) in the form of a serial number (e.g., "2G190C69543"). Each computing device 200 also has a network (IP) address (e.g., "45.349.091.231") for communicating with the management system 110 via network connections 130. For example, an administrator can assign the domain name to the management system 110, and the management system 110 can dynamically generate the network addresses of each computing device 200 when they are connected to the network of the system 100, e.g., using Dynamic Host Configuration Protocol (DHCP). Alternatively, a network provider can generate the network addresses of each computing device 200 when they are connected to the network of the system 100. Combinations of both the management system 110 and the network provider generating network addresses for the computing devices 200 can also be implemented. For example, when the management system 110 and one or more computing devices 200 are first installed, respective network addresses of the management system 110 and one or more computing devices 200 can be assigned by the network provider. Thereafter, the management system 110 can handle generation of the network addresses for new computing devices 200 that are connected to the management system 110.

Figure 4:
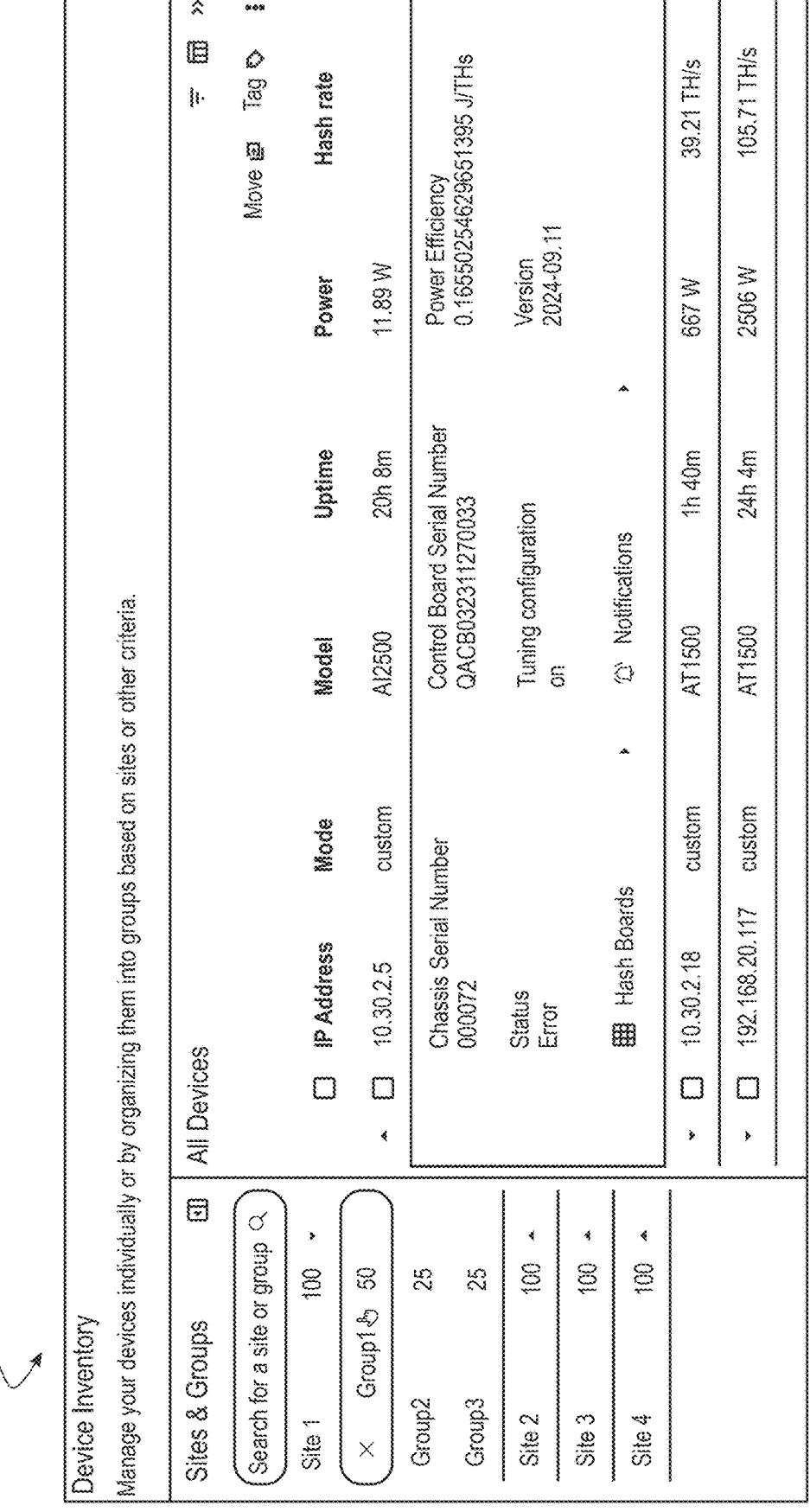
FIG. 4 is an example user interface displaying information about computing devices at multiple sites.
Figure 5:
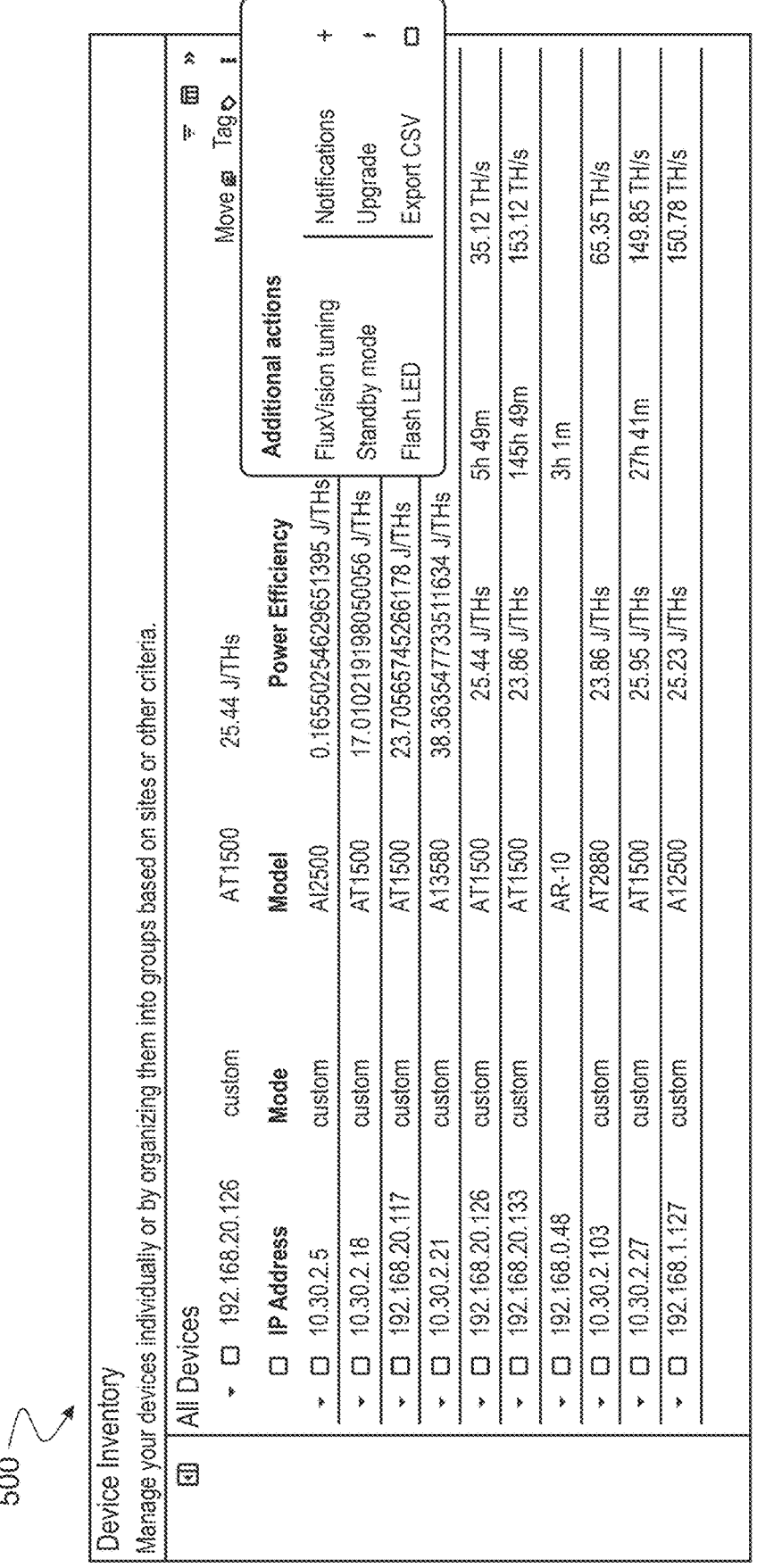
FIG. 5 is an example user interface for firmware upgrade of computing devices.
Figure 6:
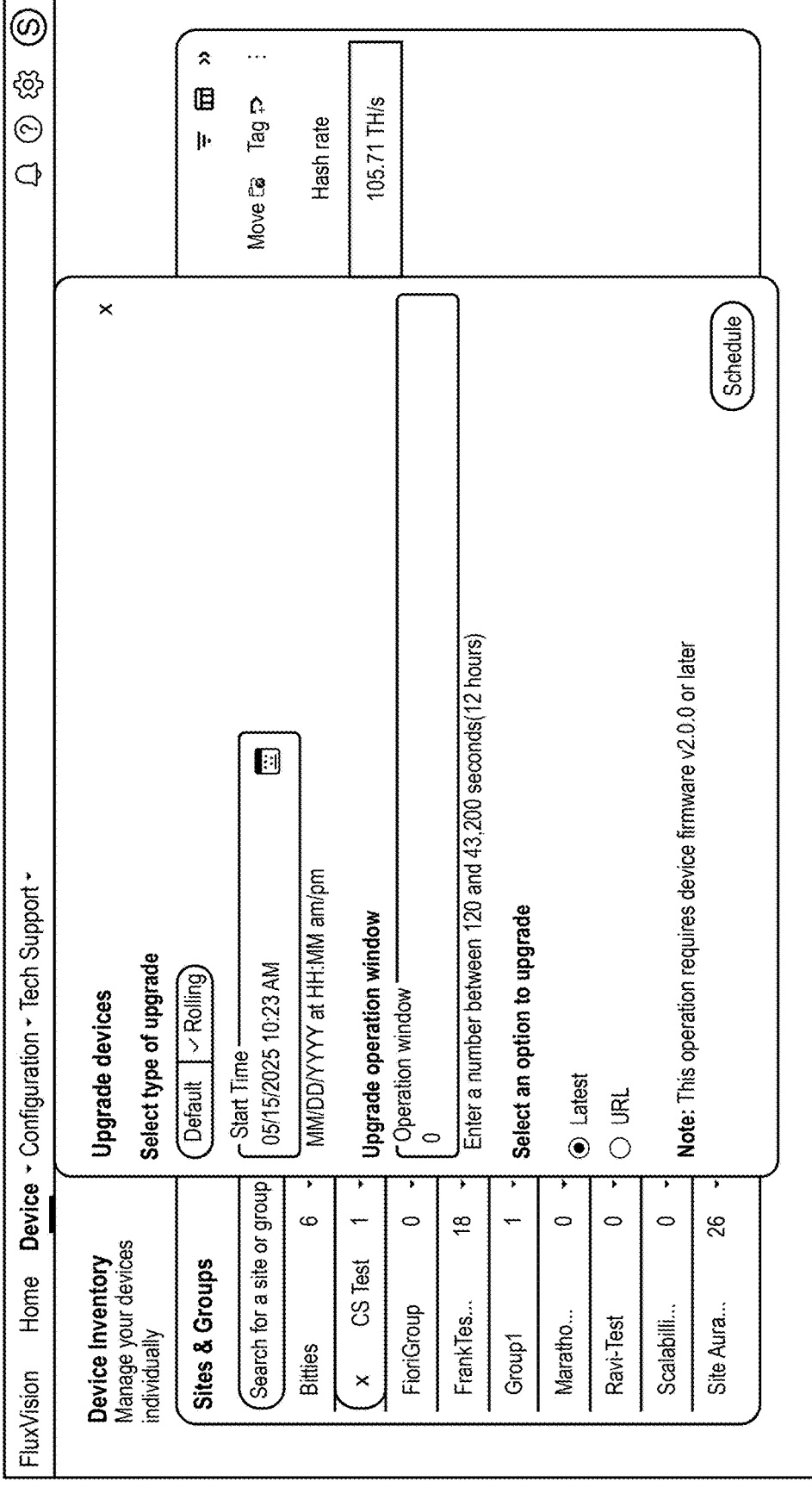
FIG. 6 is an example user interface for configuring a firmware upgrade.

The network connections 130 can be securely established and configured for bidirectional transmission of network messages using an appropriate communication protocol, e.g., using WebSocket, HTTPS, or other protocols. The management system 110 can communicate with user device(s) 150 and other devices or platforms (e.g., other servers) via a secure Application Programming Interface (API) 140. For example, a operator can provide instructions via inputs to a user interface 152 (e.g., a web or mobile application) on user device 150 (e.g., a mobile, tablet, laptop, personal computer, or other device) to control any computing devices 200 that the user owns or has been assigned to control. Examples of user interfaces are illustrated in FIGS. 4-6.

As shown in FIG. 1, a firmware upgrade system 112 is implemented on the management system 110 as computer programs to perform the various functions of the management system 110. In this example, the firmware upgrade system 112 includes a registry 114 of computing devices, a group and site control subsystem 116, a download and installation subsystem 118, and an error detection and verification subsystem 120. Note that the registry and the subsystems 114-120 are shown as individual components of firmware upgrade system 112 for ease of description and illustrative purposes only, and the firmware upgrade system 112 need not be organized in the illustrated manner. The firmware upgrade system 112 can be configured to perform some or all of the functions of the registry and the subsystems 114-120.

Registry 114 includes (e.g., stores) the respective UID and network address of each computing device 200 connected to the management system 110. The management system 110 can use registry 114 to maintain an ongoing record of all the computing devices 200 in the system 100, e.g., when and how long each computing device 200 has been active in the system 100, which computing devices 200 are available or unavailable, which computing devices 200 need maintenance or have gone out of service, etc. For example, the registry 114 may include at least some status data received from the computing devices 200.

Group and site control subsystem 116 allows the management system 110 to perform multiple functions related to grouping of computing devices 200, including one or more of the following. The management system 110 can group computing devices 200 into sites 160 and/or groups automatically and/or based on operator inputs. The management system 110 can automatically group multiple computing devices 200 according to one or more common features of the computing devices 200. For example, the management system 110 can group multiple computing devices 200 into a group of computing devices or a site 160 according to a common geolocation of the computing devices 200, common hardware specifications among the computing devices 200, a common owner of the computing devices 200, etc. For example, a common geolocation of a set of computing devices 200 can indicate that the computing devices 200 are co-located at a data center, and in response, the management system 110 can automatically store data indicating that the set of computing devices 200 are at the same site 160. As another example, within a given site 160, a first set of computing devices 200 may be assigned for control by a first entity, and a second set of computing devices 200 may be assigned for control by a second entity. In response, the management system 110 can automatically store data by grouping the first and second sets of computing devices 200 into separate first and second groups, respectively (while maintaining the first and second sets at the same site 160).

The management system 110 may also receive operator inputs through user interface 152 corresponding to a manual selection of multiple computing devices 200 that are to be grouped together into a group of computing devices 200 and/or a site of computing devices 200. The selection can include, for example, setting group and/or site on a per-computing-device basis or for multiple computing devices 200 together; moving computing device(s) 200 from a first group to a second group and/or from a first site to a second site; selecting one or more computing devices 200, one or more groups, or one or more sites for firmware upgrade, and/or the like. The management system 110 can also control a group's visibility and accessibility to user devices 150. Further discussion of user configuration of groups and sites is provided below with respect to FIGS. 4-6.

Download and installation subsystem 118 is configured to enable computing devices to download a new firmware image from the firmware image database 170 and install the new firmware image. The new firmware image can be the latest version of a firmware image or a firmware image according to a Uniform Resource Locator (URL). The new firmware image can be downloaded and installed in a central controller unit of each computing device or in an individual controller unit in each IC chip of each computing device.

Error detection and verification subsystem 120 is configured to verify the new firmware image and detect a potential error or failure during downloading and installing a new firmware image. In some examples, the error detection and verification subsystem 120 can compute a checksum or cryptographic hash of the new firmware image, compare the checksum or the cryptographic hash to a predetermined value, and reject or accept the new firmware image based on the comparison result. In some examples, the error detection and verification subsystem 120 can verify the new firmware image using a public key paired with a private key and install the new firmware image if the verification is successful. In some examples, the error detection and verification subsystem 120 can detect an error or failure during downloading or installing the new firmware image and revert to a previous firmware image.

The user device 150 can implement one or more software applications to access the management system 110 using API 140. For example, an upgrade application 154 installed on the user device 150 can present the user interface 152, receive operator inputs through the user interface 152, and send instructions and/or data corresponding to the operator inputs to the management system 110. The upgrade application 154 can be, for example, a dedicated application/ software or a web browser. For example, the web browser can access a webpage corresponding to the management system 110 (e.g., hosted at the "server.manager.com" domain) to be provided with a user interface 152 through which operator inputs can be provided.

The system 100 can further include a database 170 storing different versions of firmware images. The database 170 can include a cloud storage system (e.g., an Amazon Web Services (AWS) system or similar), or any other cloud storage system. The management system 110 is communicatively connected to the database 170 to store firmware images in the database 170 and/or obtain firmware images from the database 170.

Figure 2:
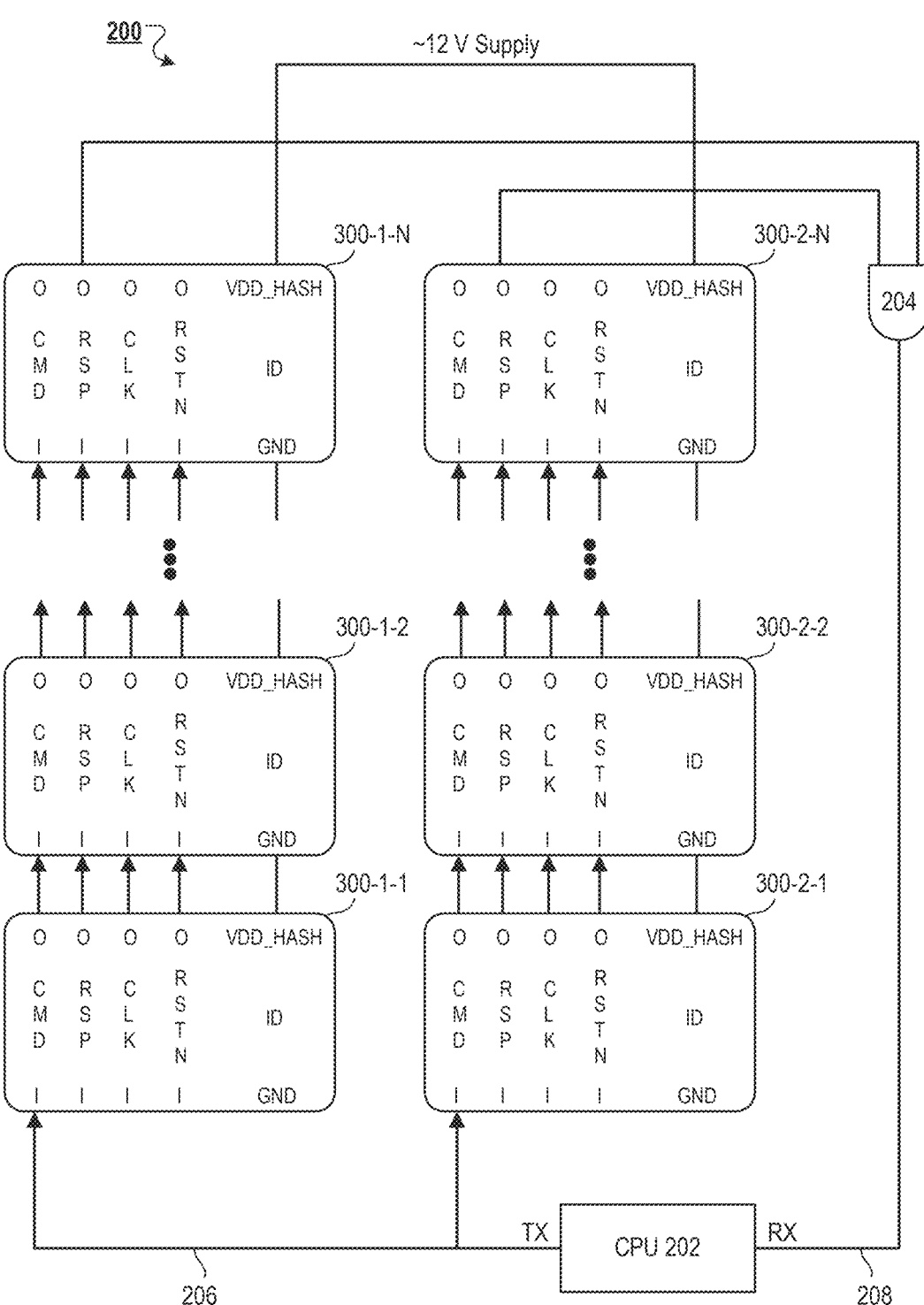
FIG. 2 is a schematic diagram of an example computing device.

FIG. 2 is a schematic diagram of an example computing device 200 shown in FIG. 1. As shown, the computing device 200 includes an electronic circuit with multiple integrated circuit (IC) chips 300-1-1 through 300-1-N and 300-2-1 through 300-2-N (each of which is referred to generally as IC chip 300), a CPU 202, and an AND gate 204. IC chips 300-1-1 through 300-1-N are connected in series and form a daisy chain by coupling the output terminals of one IC chip 300-$n$ to the input terminals of a downstream neighboring IC chip 300-($n$+1) and coupling input terminals of the IC chip 300-$n$ to output terminals of an upstream neighboring IC chip 300-($n$−1). Similarly, IC chips 300-2-1 through 300-2-N are connected in series and form another daisy chain. Note that computing device 200 in FIG. 2 is shown to include daisy chains for illustrative purposes only. In general, computing device 200 can include any suitable number of IC chips 300 (e.g., on the order of tens, hundreds, thousands, or more IC chips 300) arranged in any suitable number manner, e.g., serially in a plurality (one, two, five, ten, twenty, one hundred, or more) of daisy chains; or in parallel to one another, coupled to a common bus that communicates with CPU 202.

In some implementations, a computing device 200 includes a plurality of electronic circuits as shown in FIG. 2. For example, each illustrated electronic circuit can be realized in a printed circuit board (PCB), and the computing device 200 can include a plurality of such PCBs. In such cases, the computing device 200 can have an enclosure (e.g., a chassis) in which the plurality of PCBs are arranged (e.g., mounted on racks in the chassis), which are coupled to the CPU 202 that is also included in the enclosure.

Each IC chip 300 is generally an application-specific integrated circuit (ASIC) configured to efficiently perform tasks relating to mining operations. In this example, computing device 200 includes a command (CMD) bus 206 and a response (RSP) bus 208. The computing device 200 can also include a clock (CLK) bus, a reset (RESTN) bus, and a thermal trip (TMTP) bus (see FIG. 1C for example). Each IC chip 300 includes a pair of input and output terminals that can be coupled to a respective bus of computing device 200. In this example, each IC chip 300 has a pair of input 206-I and output 206-O terminals coupled to the command bus 206, and a pair of input 208-I and output 208-O terminals coupled to the response bus 208.

In some implementations, the computing device 200 is configured to perform cryptographic mining operations, e.g., a blockchain mining process, using the IC chips 300. In such cases, the computing device 200 can be deployed as a computational node in a crypto-mining computer network for applications that rely on blockchain mining, e.g., for cryptocurrency mining, maintaining linked records of digital transactions, etc.

IC chips 300 are configured (or customized) to perform computations instructed by CPU 202. Each chip 300 can receive an input signal from CPU 202 instructing IC chips 300 to perform computations for a particular task. After receiving the input signal, each IC chip 300 can perform the computations indicated by the input signal and transmit an output signal to CPU 202.

CPU 202 is configured to carry out arithmetic and logic operations, data manipulations, and control flow management in accordance with operations of computing device 200. For example, CPU 202 can include components such as a control unit, an arithmetic logic unit, one or more registers, and one or more caches, etc.

CPU 202 can be configured to transmit an input signal on command bus 206. The input signal can reach IC chips 300-1-1 and 300-2-1, and can be forwarded to the next IC chips 300-1-2 and 300-2-2 in the respective daisy chain.

AND gate 204 is a circuit or a device that performs a logical conjunction operation. In the shown example, AND gate 204 is configured to perform a logical conjunction operation based on response output signals from IC chips 300-1-N and 300-2-N, and transmit an operation result to CPU 202 on response bus 208.

Note that computing device 200 is shown to include one AND gate 204 for illustrative purposes only. The computing device 200 can include more than one AND gate 204, for example, when computing device 200 includes more than two daisy chains. In this case, multiple AND gates 204 can be linked and cascaded to perform logical conjunction operations based on response output signals from the daisy chains.

An example operating process of computing device 200 includes CPU 202 sending a signal on command bus 206 to IC chips 300. The signal can indicate a command to perform a particular task. Each IC chip 300 receives the signal on command bus 206, performs one or more computations corresponding to the particular task, produces one or more computation results, and transmits the computation results on response bus 208. Each IC chip 300 can combine its own computation results with an input signal on response bus 208 from an upstream neighboring IC chip 300 to generate a combined signal, and transmit the combined signal as an output signal on response bus 208 to a downstream neighboring IC chip 300. Output signals from chips 300-1-N and 300-2-N are combined by using AND gate 204 to generate a combined signal, which is then transmitted on response bus 208 to CPU 202.

Figure 3:
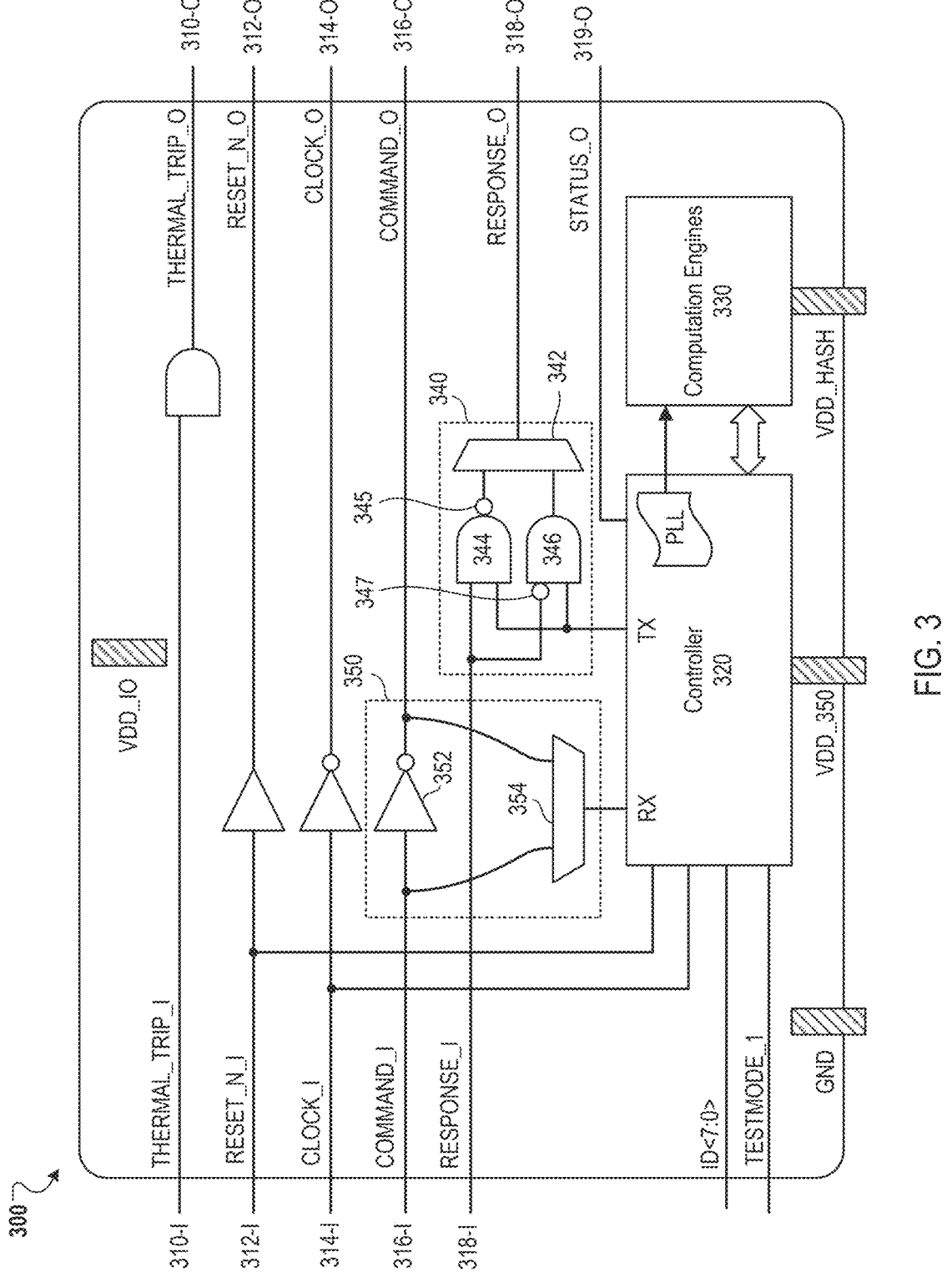
FIG. 3 is a schematic diagram of an example IC chip.

FIG. 3 is a schematic diagram of an example IC chip 300. The IC chip 300 can be, for example, an ASIC. The IC chip 300 can be of any one or more suitable types in various implementations, such as a general-purpose processor chip, a field-programmable gate array (FPGA) chip, a neural processing unit (NPU), etc.

As shown, IC chip 300 includes multiple pairs of input and output terminals coupled to multiple buses. For example, IC chip 300 includes input terminal 318-I and output terminal 318-O coupled to a response (RSP) bus, input terminal 316-I and output terminal 316-O coupled to a command (CMD) bus, input terminal 314-I and output terminal 314-O coupled to a clock (CLK) bus, input terminal 312-I and output terminal 312-O coupled to a reset (RSTN) bus, and input terminal 310-I and output terminal 310-O coupled to a thermal trip (TMTP) bus.

IC chip 300 further includes a circuit 340 for processing signals on the response bus 318. Circuit 340 is configured to receive an input signal at input terminal 318-I on the response bus 318, combine the input signal with a signal sent by controller 320 to generate a combined signal, and transmit the combined signal on the response bus 318 by using output terminal 318-O.

In the shown example, circuit 340 includes a multiplexer 342, two AND gates 344 and 346, and two inverters 345 and 347. As shown, an input terminal of inverter 345 is coupled to an output terminal of AND gate 344, and an output terminal of inverter 345 is coupled to an input terminal of multiplexer 342. An input terminal of AND gate 346 is coupled to an output terminal of inverter 347, and an output terminal of AND gate 346 is coupled to an input terminal of multiplexer 342.

In the example shown, multiplexer 342 can be configured to select, based on a control signal, one of two input signals including a first input signal that is received as an output signal of inverter 345 and a second input signal that is received as an output signal of AND gate 346, and transmit the selected input signal on the response bus 318.

IC chip 300 further includes a circuit 350 for processing signals on the command bus 316. Circuit 350 is configured to receive an input signal on the command bus 316 using input terminal 316-I, invert the input signal to generate an inverted signal, and transmit the inverted signal as an output signal on the command bus 316 using output terminal 316-O.

In the shown example, circuit 350 includes an inverter 352 and a multiplexer 354. In some implementations, inverter 352 can be configured to invert an input signal received on the command bus 316 to generate an inverted signal. In some implementations, multiplexer 354 can be configured to select, based on a control signal, one of two input signals including a first input signal that is received as the input signal of inverter 352 and a second input signal that is received as the inverted signal of inverter 352, and transmit the selected input signal to controller 320.

Controller 320 of IC chip 300 is configured to manage and coordinate operations of various components within IC chip 300. Controller 320 serves as an interface between computation engines 330 and other circuits or components of IC chip 300. Controller 320 can be configured to receive an input signal from circuit 350, and transmit an output signal to circuit 340. In some implementations, controller 320 can be communicatively coupled to computation engines 330, and can obtain computation results from computation engines 330.

IC chip 300 further includes one or more computation engines 330. Each of the computation engines 330 includes hardware components configured to perform computations in parallel with computation engines 330 of other IC chips 300. In some implementations, the computations include cryptographic hash computations, and the computation engines 330 can be referred to as hash engines. In some implementations, the cryptographic hash computations are configured for cryptocurrency mining.

In some implementations, the computation engines 330 are configured to perform machine learning computations, such as matrix multiplication for training and/or inference, e.g., for a large language model (LLM) or a generative AI model. For example, the computation engines 330 can be configured to perform AI/ML computations that have been parallelized using systolic array methods, pipelining, and/or the other suitable methods.

In some implementations, the controller 320 and/or another component of the IC chip 300 is configured to output IC chip status data. For example, the IC chip status data can be output through an output terminal 319-O and sent from the output terminal 319-O to a controller (e.g., CPU 202 in the computing device 200 of FIG. 2 that includes the IC chip 300). In some implementations, the IC chip status data is output through the same output terminal as computation results, e.g., terminal 318-O. The IC chip status data can include, for example, temperature data (e.g., a temperature of the IC chip 300), activity data (e.g., an activity state of the IC chip 300, such as whether the IC chip 300 is currently performing computations using the computation engines 330 or is idle), a current operating frequency (or clock frequency) based on which the computation engines 330 are performing computations, and the like. Further discussion of the IC chip status data is provided below with respect to FIGS. 4 to 6.

FIG. 3 shows an example of IC chip 300 that is configured for series connections with other IC chips. However, IC chips 300 within the scope of this disclosure are not limited thereto. For example, IC chips 300 can be configured to have power and/or data connections in parallel with other IC chips 300. An example of such an IC chip is IC chip 200 of FIG. 2B of U.S. application Ser. No. 19/035,308, which is incorporated herein by reference. For example, to be configured for parallel connections, the IC chip 300 may not include (and/or may not use or operate) terminals 310-O, 312-O, 314-O, 316-O, and/or 318-I, and/or circuits 340 and/or 350; may receive commands from a controller (such as CPU 202 of FIG. 2) at terminal 316-I; and/or may provide outputs to the controller at terminal 318-O. FIGS. 1A-1B of U.S. application Ser. No. 19/035,308 (which is incorporated by reference herein in its entirety for all purposes) illustrate parallel power and data connections for IC chips, and these connections can be applied to the IC chips 300 described herein. For example, the computing device 200 of FIG. 2 has a parallel configuration of IC chips 300.

Further examples of IC chips and their operating principles are described in U.S. application Ser. No. 18/217,185, which is incorporated by reference herein in its entirety for all purposes.

FIG. 4 is an example user interface 400 displaying information about computing devices at multiple sites. FIG. 4 illustrates four sites: Site 1, Site 2, Site 3, and Site 4. Although four sites are shown, the user interface 400 can include different numbers of sites in different implementations (e.g., fewer than four or more than four sites). Each site includes multiple computing devices, e.g., 100 computing devices (as shown), or some other suitable number. In some implementations, one or more of Site 1, Site 2, Site 3 and Site 4 are similar to sites 160-1, 160-2 or 160-N of FIG. 1, and one or more of the computing devices distributed across the different sites are similar to the computing device 200 of FIG. 2. In some implementations, a computing device is referred to as "device" in the user interface 400, as shown. In some implementations, the computing device can be a mining machine (referred to as a cryptocurrency miner) configured to perform the complex calculations required to mine cryptocurrency, such as Bitcoin, Litecoin, etc. In some implementations, the computing device can be an AI Accelerator configured to speed up artificial intelligence workloads, such as matrix multiplication, tensor operations, training, and/or inference of deep learning models, e.g., LLM or a generative AI model. In some implementations, one or more computing devices can be moved from one site to another site. For example, one or more computing devices at Site 1 can be moved to Site 2, Site 3, or Site 4.

In some implementations, each site can include multiple groups. For example, Site 1 is divided into three groups: Group 1, Group 2, and Group 3. In the example shown, Group 1 includes 50 computing devices, Group 2 includes 25 computing devices, and Group 3 includes 25 computing devices. In some implementations, one or more computing devices can be moved from one group to another group. For example, one or more computing devices in Group 1 can be moved to Group 2 or Group 3. For another example, one or more computing devices in Group 1 can be moved to a particular group at Site 2, Site 3, or Site 4.

A device can have a plurality of parameters that are shown in rows by the user interface 400, e.g., Internet Protocol (IP) Address, Mode, Model, Uptime (a period during which a computing device is available and operational), Power, and Hash rate. The example shown in FIG. 4 illustrates the parameters for three devices in Group 1 of Site 1, with each row corresponding to the parameters for one device. The plurality of parameters for each device can further include chassis serial number, control board serial number, power efficiency, status, tuning configuration, and firmware version. By selecting a row in the user interface 400, these additional parameters for the device corresponding to the selected row can be displayed. The example shown in FIG. 4 illustrates these additional parameters for a selected device in Group 1 of Site 1, which has an IP address 10.30.2.5.

FIG. 5 is an example user interface 500 for firmware upgrade of computing devices. The user interface 500 illustrates a list of computing devices, which can be arranged in rows, with each row corresponding to an individual device as shown. An operator can select one or more computing devices and click "Upgrade" under "Additional actions" to initiate a firmware upgrade of the selected one or more computing devices. In some implementations, the operator can select a particular site, e.g., Site 1 of FIG. 4, and click "Upgrade" under "Additional actions" to initiate a firmware upgrade of all the computing devices (e.g., 100 computing devices) at Site 1. In some implementations, the operator can select a particular group, e.g., Group 1 of Site 1 as shown in FIG. 4, and click "Upgrade" under "Additional actions" to initiate a firmware upgrade of all the computing devices (e.g., 50 computing devices) in Group 1.

In some implementations, the firmware upgrade system 112 can upgrade a central controller unit in a single selected computing device, e.g., CPU 202 of computing device 200 of FIG. 2. In some implementations, the firmware upgrade system 112 can upgrade central controller units for a plurality of selected computing devices in a site or group, where the number of selected computing devices can be less than the total number of computing devices in the site or group, as applicable. In some implementations, the firmware upgrade system 112 can upgrade central controller units of all the computing devices in a selected site or group.

In some implementations, the firmware upgrade system 112 can upgrade an individual controller unit (e.g., controller 320 of FIG. 3) included in each IC chip in a single selected computing device. In some implementations, the firmware upgrade system 112 can upgrade an individual controller unit included in each IC chip of a plurality of selected computing devices in a site or group, where the number of selected computing devices is less than the total number of computing devices in the site or group, as applicable. In some implementations, the firmware upgrade system 112 can upgrade an individual controller unit included in each IC chip of all computing devices in a selected site or group.

Referring to FIG. 1, during firmware upgrade, the firmware upgrade system 112 can obtain a new firmware image from database 170 and perform error detection (e.g., redundancy check) on the new firmware image. In some examples, the firmware upgrade system 112 can compute a checksum or cryptographic hash of the new firmware image and compare the checksum or the cryptographic hash to a predetermined value. If the checksum or the cryptographic hash is equal to the predetermined value, the firmware upgrade system 112 accepts the new firmware image and instructs the selected computing device(s) in the selected site or group, as described above, to download and install the new firmware image, and notifies the user device 150 that the upgrade is successful. If the checksum or the cryptographic hash is different from the predetermined value, the firmware upgrade system 112 rejects the new firmware image and notifies the user device 150 that the upgrade is unsuccessful. In some implementations, each of computing devices, instead of the firmware upgrade system 112, can perform error detection of the new firmware image.

In some examples, firmware upgrade system 112 or computing devices can detect a failure when downloading or installing a new firmware image and revert to a previous firmware image. In some implementations, a selected computing device can download and install the new firmware image to an individual controller unit (e.g., controller 320 of FIG. 3) in each IC chip of the selected computing device. In some implementations, a selected computing device can download and install the new firmware image to the central controller unit (e.g., CPU 202 of FIG. 2) in the selected computing device. If the firmware upgrade system 112 or a selected computing device detects a failure when downloading or installing the new firmware image, the selected computing device can revert to the previous firmware image. The individual controller unit or the central controller unit executes the previous firmware image.

In some examples, the new firmware image is signed with a private key that is paired with a public key. The firmware upgrade system 112 or each of computing devices stores the public key. The firmware upgrade system 112 or computing devices can verify the new firmware image using the public key, and installation of the new firmware image can proceed if the verification is successful.

FIG. 6 is an example user interface 600 for configuring a firmware upgrade. In some implementations, an operator can select an upgrade type, e.g., "Default" or "Rolling". The "Default" indicates a firmware upgrade of all the selected computing devices at the same time. The "Rolling" indicates a staged rollout of the firmware upgrade of the selected computing devices. In some implementations, an operator can select an upgrade option, e.g., "Latest" or "URL". The "Latest" indicates downloading and installing the latest version of firmware, while "URL" indicates downloading and installing a specific version of firmware (which may not be the latest version of firmware) from a storage location corresponding to the URL provided by the firmware upgrade system 112. The operator can configure an "upgrade operation start time" of the firmware upgrade, e.g., 10:07 PM EST on Mar. 5, 2025. The operator can further configure an "upgrade operation window" of the firmware upgrade, e.g., a time window between 120 seconds and 43200 seconds (12 hours). The "Default" upgrade can start at "upgrade operation start time" and can be performed and completed within the "upgrade operation window".

In some implementations, the firmware upgrade system 112 can perform a staged rollout (e.g., "rolling upgrade") of the firmware upgrade of computing devices at a particular site or in a particular group within the time window from the start time point. In some examples, the operator can select subsets of computing devices, or the firmware upgrade system 112 can select subsets of computing devices based on groups, site location, rack location, downtime of computing devices, etc., and upgrade firmware for computing devices in the selected subsets sequentially. For example, computing devices in a first subset (for example, Group 1 of Site 1 shown in user interface 400) can be upgraded in parallel at a first time point that is specified using a first value of "upgrade operation start time" and/or a first value of "upgrade operation window"; computing devices in a second subset (for example, Group 2 of Site 1 shown in user interface 400) can be upgraded in parallel at a second time point that is specified using a second value of "upgrade operation start time" and/or a second value of "upgrade operation window"; and computing devices in a third subset (for example, Group 3 of Site 1 shown in user interface 400) can be upgraded in parallel at a third time point that is specified using a third value of "upgrade operation start time" and/or a third value of "upgrade operation window."

In some implementations, an operator can specify a particular "upgrade operation start time" and a value of "upgrade operation window," and then opt to perform a staged rollout of a plurality of computing devices in a site or group (e.g., by selecting "rolling" upgrade option). Based on the operator's instructions, the firmware upgrade system 112 can dynamically perform staged upgrades for subsets of computing devices in the selected site or group. The management system can perform the upgrades within the specified upgrade operation window starting at the specified start time. Alternatively, the management system can randomize the start time within the specified upgrade operation window, using the specified start time as the seed for the randomization. For example, the operator can select to perform a rolling upgrade of all devices at Site 1 shown in user interface 4. The firmware upgrade system 112 can commence with upgrades of the devices in Group 1 of Site 1 at the specified start time (or a randomized start time using the specified start time and/or upgrade window as a seed); upon completion of upgrades of the devices in Group 1 of Site 1, the firmware upgrade system 112 can commence with upgrades of the devices in Group 2 of Site 1; and subsequently upon completion of Group 2 upgrades, the firmware upgrade system 112 can commence with upgrades of the devices in Group 3 of Site 1.

Figure 7:
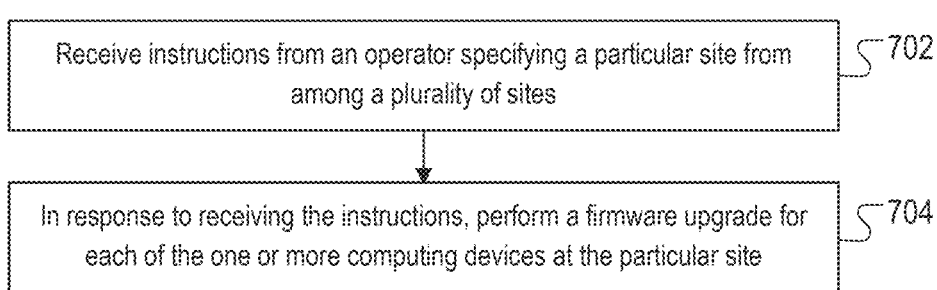
FIG. 7 is a flowchart of an example method for firmware upgrade.

FIG. 7 is a flowchart of an example method for firmware upgrade, according to some implementations. The method 700 can be performed by the firmware upgrade system 112, or any suitable system, environment, software, hardware, or combination thereof. In some implementations, operations of the method 700 can be run in parallel, in combination, in loops, or in any order. The example method 700 can be modified or reconfigured to include additional, fewer, or different steps (not shown in FIG. 7), which can be performed in the order shown or in a different order.

At 702, the firmware upgrade system 112 receives instructions from an operator specifying a particular site from among a plurality of sites. Each site includes multiple computing devices (e.g., computing device 200 of FIG. 2), and each computing device includes multiple IC chips (e.g., IC chip 300 of FIG. 3) that are configured to perform similar computations (e.g., cryptographic hash computations or machine learning computations for an LLM or a generative AI model) in parallel.

In some implementations, the operator, through a user interface (e.g., user interface 152 of FIG. 1, user interface 400 of FIG. 4, or user interface 500 of FIG. 5) of an operator machine (e.g., user device 150 of FIG. 1), selects the particular site (e.g., Site 1 of FIG. 4) from among the plurality of sites (e.g., Site 1, Site 2, Site 3, and Site 4 of FIG. 4) represented on the user interface.

In some implementations, the firmware upgrade system 112 performs a firmware upgrade of a central controller unit (e.g., CPU 202 of FIG. 2) included in each computing device at the particular site. In some implementations, the firmware upgrade system 112 performs a firmware upgrade of an individual controller unit (e.g., controller 320 of FIG. 3) included in each IC chip in each computing device at the particular site.

At 704, in response to receiving the instructions, the firmware upgrade system 112 performs a firmware upgrade for each of the one or more computing devices at the particular site.

In some implementations, each site includes multiple groups (e.g., Group 1, Group 2, and Group 3 of FIG. 4), and each group includes multiple computing devices. The firmware upgrade system 112 can further receive second instructions specifying a particular group (e.g., Group 1 of FIG. 4) of a site (e.g., Site 1 of FIG. 4). In response to receiving the second instructions, the firmware upgrade system 112 performs a firmware upgrade for one or more selected computing devices in the specified group.

In some implementations, the operator, through a user interface (e.g., user interface 152 of FIG. 1, user interface 400 of FIG. 4, or user interface 500 of FIG. 5) of an operator machine (e.g., user device 150 of FIG. 1), selects a particular group (e.g., Group 1 of FIG. 4) from among the plurality of groups (e.g., Group 1, Group 2, and Group 3 of FIG. 4) represented on the user interface.

In some implementations, the firmware upgrade system 112 performs a firmware upgrade of a central controller unit (e.g., CPU 202 of FIG. 2) in one or more selected computing devices in a particular group. In some implementations, the firmware upgrade system 112 performs a firmware upgrade of an individual controller unit (e.g., controller 320 of FIG. 3) included in each IC chip in each of one or more selected computing devices in a particular group.

In some implementations, the operator, through a user interface (e.g., user interface 152 of FIG. 1, user interface 400 of FIG. 4, or user interface 500 of FIG. 5) of an operator machine (e.g., user device 150 of FIG. 1) can configure a start time point and a time window of the firmware upgrade. The firmware upgrade system 112 can perform a staged rollout of the firmware upgrade of IC chips in selected computing device(s) in the particular group or at the particular site within the time window from the start time point, as described with respect to FIG. 6.

In some implementations, the firmware upgrade system 112 or computing devices can download and install a new firmware image to the central controller unit (e.g., CPU 202 of FIG. 2) included in each selected computing device or the individual controller unit (e.g., controller 320 of FIG. 3) included in each IC chip in each selected computing device.

In some implementations, the firmware upgrade system 112 or computing devices can compute a checksum or cryptographic hash of the new firmware image, compare the checksum or the cryptographic hash to a predetermined value, and reject or accept the new firmware image based on the comparison result.

In some implementations, if the firmware upgrade system 112 or a computing device detects a failure during downloading or installing the new firmware image, the firmware upgrade system 112 or the computing device can revert each IC chip of the computing device to a previous firmware image.

In some implementations, the firmware upgrade system 112 or computing devices can verify the new firmware image using a public key. The new firmware image was signed with a private key paired with the public key. The firmware upgrade system 112 or computing devices can install the new firmware image if the verification is successful.

The firmware upgrade system 112 can further receive third instructions specifying a particular computing device (e.g., the computing device having an IP address of 10.30.2.5 of FIG. 4) at a site (e.g., Site 1 of FIG. 1). In response to receiving the third instructions, the firmware upgrade system 112 performs a firmware upgrade for the particular computing device.

Figure 8:
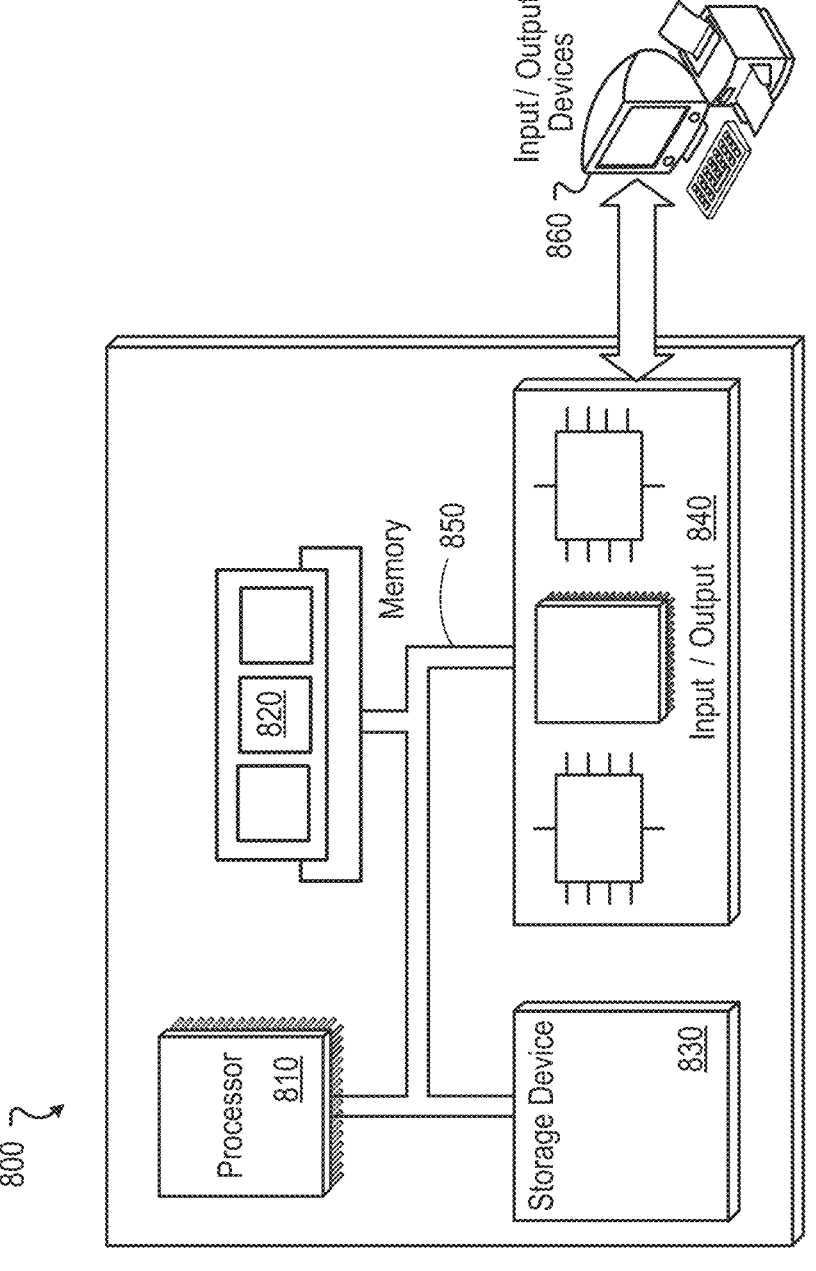
FIG. 8 is a schematic diagram of an example computer system.

FIG. 8 is a schematic diagram of an example computer system. In some implementations, the computer system 800 may include or be a part of one or more of the entities described herein. As depicted in FIG. 8, the computer system 800 includes a processor 810, a memory 820, a storage device 830, and an input/output device 840. Each of these components can be interconnected, for example, by a system bus 850. The processor 810 is capable of processing instructions for execution within the computer system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the computer system 800. For example, the memory 820 and/or the storage device 830 can store measurement data from one or more fluid-level sensors as they are received by the control system, as described in the preceding sections. Additionally or alternatively, the memory 820 and/or the storage device 830 can store historical measurement data. Although the computer system 800 is shown as having one processor 810, one memory 820, and one storage device 830 for illustrative purposes, the computer system 800 can include any number of processors 810, memories 820, and storage devices 830 based on system requirements.

The input/output device 840 provides input/output operations for the computer system 800. In some implementations, the input/output device 840 can include one or more of a network interface device (for example, an Ethernet card), a serial communication device (for example, an RS-232 port), or a wireless interface device (for example, an 802.11 card, a 3G wireless modem, a 4G wireless modem, or a 5G wireless modem), or some combination thereof. In some implementations, the input/output device can include driver devices configured to receive input data and send output data to other input/output devices, for example, a keyboard, printer, and/or display devices 860. In some implementations, mobile computing devices, mobile communication devices, and other devices can also be used.

While the present disclosure describes many examples, these should not be construed as limitations on the scope of an invention that is claimed or of what may be claimed, but rather as descriptions of features specific to particular embodiments. Certain features that are described in the context of separate embodiments can also be implemented in combination in a single embodiment. Conversely, various features that are described in the context of a single embodiment can also be implemented in multiple embodiments separately or in any suitable sub-combination. Although some features may be described as acting in certain combinations and even initially claimed as such, one or more features from a claimed combination in some cases can be excised from the combination, and the claimed combination may be directed to a sub-combination or a variation of a sub-combination. Similarly, while some operations may be depicted in the drawings in a particular order, this should not be understood as requiring that such operations are performed in the particular order shown or in sequential order, or that all illustrated operations be performed, to achieve desirable results.

A number of embodiments have been described. Nevertheless, it is understood that various modifications can be made without departing from the spirit and scope of the present disclosure. Accordingly, other embodiments are within the scope of the following claims.

We claim:

1. A method comprising:

displaying, on a user interface of an operator machine, information about a plurality of computing devices distributed in a plurality of sites, wherein each of the plurality of sites comprises one or more computing devices, each of the one or more computing devices comprising a plurality of integrated circuit (IC) chips that are configured to perform similar computations in parallel;

receiving instructions specifying a particular site from among the plurality of sites, wherein the instructions comprise at least one of an input configuring a particular start time point of a firmware upgrade, or a time window of the firmware upgrade; and in response to receiving the instructions, performing a firmware upgrade for each of the one or more computing devices at the particular site, wherein performing the firmware upgrade comprises:

performing a staged rollout of the firmware upgrade of the plurality of IC chips at the particular site within the time window from the particular start time point, wherein performing the staged rollout of the firmware upgrade of the plurality of IC chips comprises selecting subsets of the plurality of IC chips and performing the firmware upgrade of the selected subsets sequentially, different subsets being selected at different start time points within the time window.

2. The method of claim 1, wherein receiving the instructions specifying the particular site comprises:

receiving, through the user interface of the operator machine, an input selecting the particular site from among the plurality of sites represented on the user interface.

3. The method of claim 1, wherein performing the firmware upgrade for each of the one or more computing devices at the particular site comprises at least one of:

performing a firmware upgrade of a central controller unit included in each of the one or more computing devices at the particular site, or performing a firmware upgrade of an individual controller unit included in each of the plurality of IC chips in each of the one or more computing devices at the particular site.

4. The method of claim 1, comprising:

displaying, on the user interface, information about a plurality of groups in at least one site, wherein each of the plurality of groups comprises one or more computing devices;

receiving second instructions specifying one or more groups from among the plurality of groups; and in response to receiving the second instructions, performing a firmware upgrade for one or more computing devices in each of the one or more specified groups.

5. The method of claim 4, wherein performing the firmware upgrade for each of the one or more computing devices in each of the one or more specified groups comprises at least one of:

performing a firmware upgrade of a central controller unit included in each of the one or more computing devices in each of the one or more specified groups, or performing a firmware upgrade of an individual controller unit included in each of the plurality of IC chips in each of the one or more computing devices in each of the one or more specified groups.

6. The method of claim 3, wherein performing the firmware upgrade comprises downloading and installing a new firmware image to the central controller unit included in each of the one or more computing devices or the individual controller unit included in each of the plurality of IC chips in each of the one or more computing devices.

7. The method of claim 6, wherein performing the firmware upgrade further comprises:

computing a checksum or cryptographic hash of the new firmware image;

comparing the checksum or the cryptographic hash to a predetermined value; and rejecting or accepting the new firmware image based on the comparison result.

8. The method of claim 6, wherein performing the firmware upgrade further comprises:

detecting a failure during downloading or installing of the new firmware image; and reverting each of the plurality of IC chips to a previous firmware image.

9. The method of claim 6, wherein performing the firmware upgrade further comprises:

verifying the new firmware image using a public key, wherein the new firmware image was signed with a private key paired with the public key; and installing the new firmware image in response to the verification being successful.

10. The method of claim 1, further comprising:

displaying, on the user interface, information about a plurality of computing devices at the particular site;

receiving third instructions specifying a particular computing device from among the plurality of computing devices at the particular site; and in response to receiving the third instructions, performing a firmware upgrade for the particular computing device.

11. The method of claim 10, wherein performing the firmware upgrade for the particular computing device at the particular site comprises at least one of:

performing a firmware upgrade of a central controller unit included in the particular computing device, or performing a firmware upgrade of an individual controller unit included in each of a plurality of IC chips in the particular computing device.

12. The method of claim 4, further comprising:

displaying, on the user interface, information about a plurality of computing devices in the one or more specified groups;

receiving third instructions specifying a particular computing device from among the plurality of computing devices in the one or more specified groups; and in response to receiving the third instructions, performing a firmware upgrade for the particular computing device.

13. The method of claim 12, wherein performing the firmware upgrade for the particular computing device comprises at least one of:

performing a firmware upgrade of a central controller unit included in the particular computing device, or performing a firmware upgrade of an individual controller unit included in each of a plurality of IC chips in the particular computing device.

14. The method of claim 1, wherein the plurality of IC chips are configured to perform cryptographic hash computations or process large language model data.

15. One or more non-transitory computer-readable media storing instructions that, when executed, cause one or more processors to perform operations comprising the method of claim 1.

16. The method of claim 1, wherein performing the firmware upgrade of the selected subsets sequentially comprises one of:

(i) performing a firmware upgrade of a second subset of IC chips after completion of a firmware upgrade of a first subset of IC chips, (ii) performing the firmware upgrade of the second subset of IC chips before the completion of the firmware upgrade of the first subset of IC chips, or (iii) performing firmware upgrades of IC chips in each subset in parallel.

17. The method of claim 1, wherein performing the firmware upgrade of the selected subsets comprises determining a randomized start time point for each subset of IC chips, using the particular start time point as a seed for randomization.

18. A system comprising:

a plurality of computing devices distributed in a plurality of sites, each of the plurality of sites comprising one or more computing devices, each of the one or more computing devices comprising a plurality of integrated circuit (IC) chips that are configured to perform similar computations in parallel;

an operator machine communicably coupled to the plurality of computing devices; and memory storing instructions that, when executed, cause one or more processors to perform operations comprising:

displaying, on a user interface of the operator machine, information about the plurality of computing devices distributed in the plurality of sites;

receiving instructions specifying a particular site from among the plurality of sites, wherein the instructions comprise at least one of an input configuring a particular start time point of a firmware upgrade, or a time window of the firmware upgrade; and in response to receiving the instructions, performing a firmware upgrade for each of the one or more computing devices at the particular site, wherein performing the firmware upgrade comprises:

performing a staged rollout of the firmware upgrade of the plurality of IC chips at the particular site within the time window from the particular start time point, wherein performing the staged rollout of the firmware upgrade of the plurality of IC chips comprises selecting subsets of the plurality of IC chips and performing the firmware upgrade of the selected subsets sequentially, different subsets being selected at different start time points within the time window.

19. The system of claim 18, wherein performing the firmware upgrade for each of the one or more computing devices at the particular site comprises at least one of:

performing a firmware upgrade of a central controller unit included in each of the one or more computing devices at the particular site, or performing a firmware upgrade of an individual controller unit included in each of the plurality of IC chips in each of the one or more computing devices at the particular site.

20. The system of claim 18, wherein performing the firmware upgrade of the selected subsets comprises determining a randomized start time point for each subset of IC chips, using the particular start time point as a seed for randomization.

\* \* \* \* \*